(12) United States Patent
Harden et al.

(10) Patent No.: US 10,259,564 B2
(45) Date of Patent: Apr. 16, 2019

(54) CONTROLLING ELEVATOR TO STABILIZER OFFLOAD IN FLY-BY-WIRE AIRCRAFT SYSTEMS

(71) Applicant: Gulfstream Aerospace Corporation, Savannah, GA (US)

(72) Inventors: Michael Clay Harden, Savannah, GA (US); Jong-Yeob Shin, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 89 days.

(21) Appl. No.: 15/231,076

(22) Filed: Aug. 8, 2016

(65) Prior Publication Data
US 2018/0037313 A1  Feb. 8, 2018

(51) Int. Cl.
*B64C 13/16* (2006.01)
*B64C 5/02* (2006.01)
*B64C 5/10* (2006.01)

(52) U.S. Cl.
CPC ............... *B64C 13/16* (2013.01); *B64C 5/02* (2013.01); *B64C 5/10* (2013.01)

(58) Field of Classification Search
CPC .. B64C 13/16; B64C 5/02; B64C 5/10; B64C 13/503; G05D 1/0623; G05D 1/0816; G05D 1/085
See application file for complete search history.

(56) References Cited

U.S. PATENT DOCUMENTS

| 4,825,375 A | * | 4/1989 | Nadkarni | G05D 1/0607 244/178 |
| 2010/0042271 A1 | * | 2/2010 | Holzhausen | B64C 9/04 701/4 |
| 2010/0078518 A1 | * | 4/2010 | Tran | B64C 13/16 244/87 |
| 2016/0122000 A1 | * | 5/2016 | Mahmulyin | B64C 13/16 244/230 |
| 2016/0304189 A1 | * | 10/2016 | Carton | B64C 13/22 |
| 2017/0242444 A1 | * | 8/2017 | Eggold | G05D 1/0676 |

* cited by examiner

*Primary Examiner* — Dale Moyer
(74) *Attorney, Agent, or Firm* — LKGlobal | Lorenz & Kopf, LLP (57) ABSTRACT

A control unit for controlling movement of a stabilizer and an elevator on an aircraft, the control unit comprising a processor which is configured to receive a pitch reference command from a flight control input device of the aircraft, determine, based on the pitch reference command, an elevator command configured to command the elevator in the aircraft nose-up or nose-down direction, determine a difference between the elevator command and a desired elevator value corresponding to the pitch reference command, determine a threshold value as a desired maximum elevator deflection at a given pitch reference command, compare the difference with the threshold value and in response thereto generate a command signal configured to retain a current position of the stabilizer when the difference is smaller than or equal to the threshold value, and to command the elevator in the aircraft nose-up or nose-down direction based on the pitch reference command.

20 Claims, 5 Drawing Sheets

CONTROLLING ELEVATOR TO STABILIZER OFFLOAD IN FLY-BY-WIRE AIRCRAFT SYSTEMS

TECHNICAL FIELD

The technical field relates generally to controlling elevator and stabilizer motion. In particular, the description relates to a control unit and an aircraft.

BACKGROUND

A conventional aircraft typically includes flight control surfaces that are mechanically coupled with a flight control input device. The flight control surfaces alter the aerodynamic forces on the aircraft to adjust the pitch, roll, or yaw angles of the aircraft.

Fly-by-wire technology mechanically decouples motion of the flight control surfaces from the flight control input device. Instead, the flight control surfaces are adjusted by actuators that are electronically coupled with control means. Said control means may receive an input from a pilot control input device and may process the input from the pilot to generate control commands provided to the actuators. One example of a pilot control input device may be the cockpit pitch input or, in general, a flight control input device. In particular, such a flight control input device may be referred to as side-stick, active side-stick, cockpit pitch input, or pilot control column. It should be noted that in this document these terms may be synonyms generally referring to a flight control input device.

As such, it may be desirable to describe an approach of controlling stabilizer and elevator motion for an augmented control scheme of an aircraft whereby extensive motion of the stabilizer is avoided or reduced, in general.

BRIEF SUMMARY

Various non-limiting embodiments of a control unit configured to control stabilizer and elevator motion of an aircraft and non-limiting embodiments of an aircraft are disclosed herein.

In a first non-limiting embodiment, a control unit for controlling movement of a stabilizer and an elevator on an aircraft is provided. The control unit comprises a processor which is configured to: receive a pitch reference command from a flight control input device of the aircraft; determine, based on the pitch reference command, an elevator command configured to command the elevator in the aircraft nose-up or nose-down direction; determine a difference between the elevator command and a desired elevator value corresponding to the pitch reference command; determine a threshold value as a desired maximum elevator deflection at a given pitch reference command; compare the difference with the threshold value and in response thereto generate a command signal configured to retain a current position of the stabilizer when the difference is smaller than or equal to the threshold value, and to command the elevator in the aircraft nose-up or nose-down direction based on the pitch reference command.

In a second non-limiting embodiment, an aircraft is provided. The aircraft comprises: a horizontal stabilizer and an elevator for pitch axis control; a flight control input device; a control unit with a processor, wherein the processor is configured to receive a pitch reference command from the flight control input device and for determining, based at least on the pitch reference command, an elevator command configured to command the elevator to move in a nose-up or a nose-down direction; wherein the processor is configured to determine a difference between the determined elevator command and a desired elevator value corresponding to the received pitch reference command and to further determine a threshold value as a desired maximum elevator deflection at a given pitch reference command; wherein the processor is further configured to compare the difference with the threshold value and in response thereto generate a command signal configured to move the elevator based on the pitch reference command and to retain a current position of the stabilizer when the difference is smaller than or equal to the threshold value.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical and/or mechanical couplings between the various elements. It should be noted that many alternative or additional functional relationships or physical connections may be present in an embodiment of the disclosure.

Figure 1:
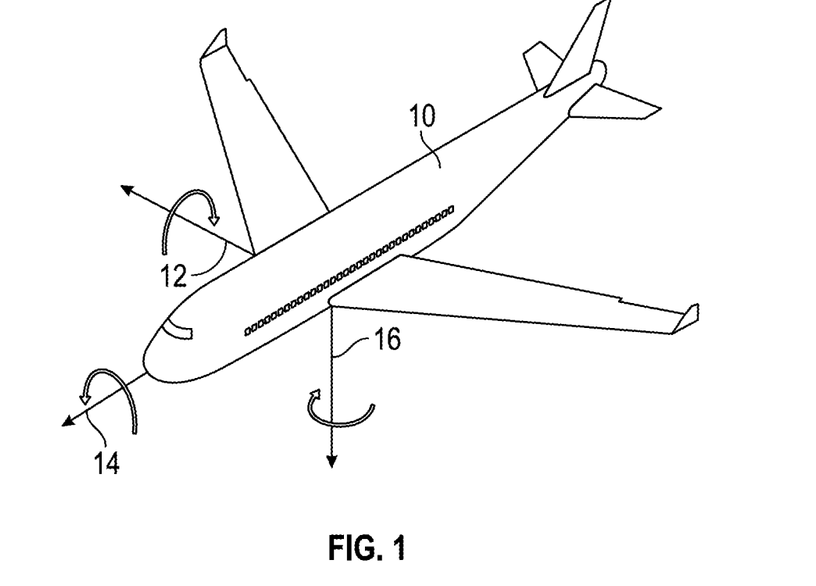
FIG. 1 is a schematic view illustrating an aircraft in accordance with some non-limiting embodiments.
Figure 2:
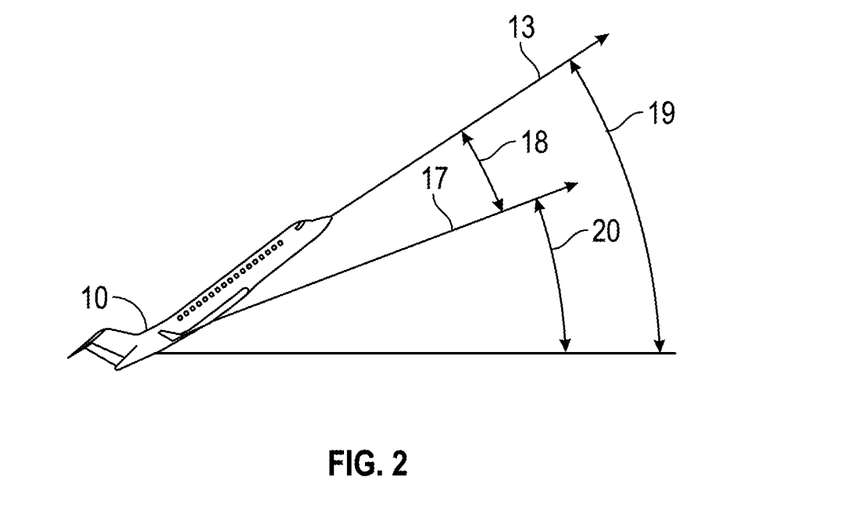
FIG. 2 is a schematic view illustrating an aircraft flight path in accordance with some non-limiting embodiments.
Figure 3:
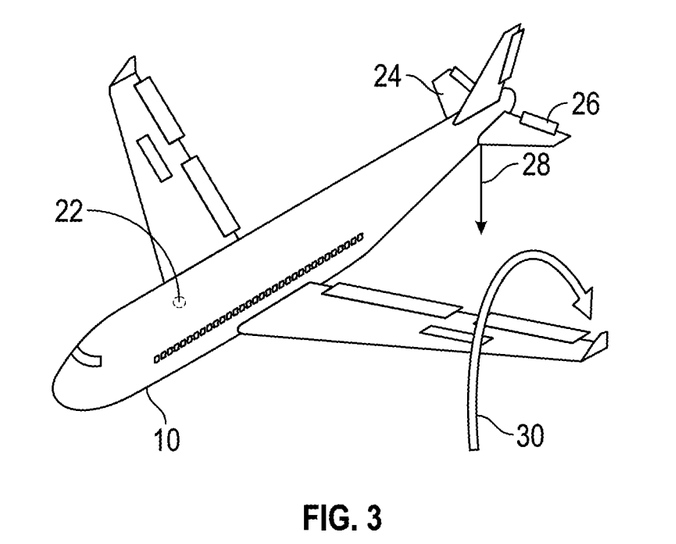
FIG. 3 is a schematic view illustrating an aircraft in accordance with some non-limiting embodiments.

Referring now to FIG. 1, FIG. 2, and FIG. 3, an aircraft 10, which may be an airplane, for example, is described as to define the fundamental terms used in the context of this description.

Although aircraft 10 is referred to in this description, it should be appreciated that the approach described herein may be utilized in land vehicles, water vehicles, space vehicles, or other machinery without departing from the scope of the present disclosure.

In FIG. 1, aircraft 10 and the three main axes of rotation are shown. There is shown the pitch axis 12, the roll axis 14, and the yaw axis 16. In FIG. 2, aircraft 10 is illustrated in flight with a pitch angle 19 relative to a horizontal plane, as will be appreciated by those of ordinary skill in the art. The pitch angle 19 is the sum of the flight path angle 20 which again is defined by the flight path vector 17 and the angle of attack 18 which is the delta between the longitudinal axis 13 of the aircraft 10 and the flight path vector 17.

FIG. 3 schematically shows the pitch control of aircraft 10. The aircraft 10 comprises a horizontal stabilizer 24 with an elevator 26. Motion of horizontal stabilizer 24 and/or elevator 26 causes a down force 28 (or an up force, which is not shown) at the tail of the aircraft 10 which results in a rotation 30 around the pitch axis (see FIG. 1) which runs through the center of gravity 22.

Pitch axis control is concerned with controlling angle of attack in the short term (and in consequence load factor or g's, pitch rate, and pitch attitude) and airspeed and altitude rate in the medium term, and altitude in the long term. Control of these two sets of related terms typically requires two separable pilot inputs, usually elevator and thrust.

This description is concerned with pitch control via a conventional airplane elevator. Thrust will be assumed unchanging or not relevant here. Pilots use elevator deflection (or a similar surrogate) over the short term to achieve and maintain the desired airplane response. To relieve the requirement for the pilot to hold the elevator controls for long periods, the horizontal stabilizer (or on some aircraft a surrogate) is moved to balance the airplane without pilot elevator input. Use of the stabilizer is referred to as "trimming" or bringing the airplane into "trim". The steady airspeed is called the "trim speed".

Basically, there are three paradigms of controlling the elevator and stabilizer in aircraft, namely the convention, mechanical control, the fly by wire (FBW) direct control, and the FBW augmented control scheme.

According to the conventional mechanical control scheme, the pilot moves the flight control input device to achieve desired flight path and adjusts trim switch to relieve the flight control input device forces. The cockpit controls are physically connected to aerodynamic surfaces. The target speed selected by the pilot or "trim speed" is a result of the combined pilot inputs.

The FBW direct control replaces the physical connection of the cockpit controls to the aerodynamic surfaces by a flight control computer (FCC) or some surrogate computational device, which commands actuators to move the stabilizer and the elevator accordingly. The cockpit inputs form FCC surface commands and the FCC moves aerodynamic surfaces to the commanded position.

According to the FBW augmented control scheme, the cockpit inputs form FCC maneuver commands (i.e., angle of attack or delta angle of attack) and the FCC uses augmented command and feedback to achieve the commanded maneuver. As a result, the target speed selected by the pilot or "trim speed" may be a parameter stored in the FCC and adjusted by the trim switch.

In the case of augmented control, the pilot trim switch is no longer a command to move the horizontal stabilizer. Instead, the trim switch may be an input device used to adjust the steady-state speed command. This FCC "trim speed" signal may be used, in conjunction with the flight control input device inputs, in the elevator and stabilizer control (horizontal stabilizer control) algorithm. It should be noted that some design details may vary between different airplanes and are intentionally simplified here for purpose of the description. For instance, an augmented control airplane may be designed to remove the trim switch altogether, in which case the trim speed is continually set to the current speed, or may be occasionally set to the current speed by pilot action. Thus, for airplanes with augmented pitch control, there is no obvious connection between trim switch commands by the pilot and stabilizer motion. The means by which the FCC controls stabilizer motion is the subject of the ongoing description, and is referred to as the elevator offload function, in the sense that the horizontal stabilizer is used to automatically and continuously remove the undesirable or excess load being carried by the elevator.

Figure 4:
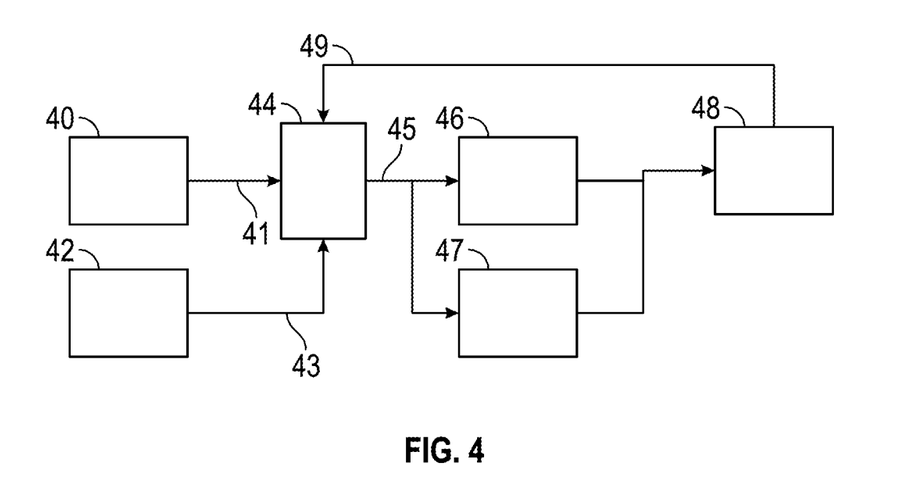
FIG. 4 is a schematic view illustrating an augmented control scheme for an aircraft in accordance with some non-limiting embodiments.

FIG. 4 schematically shows the principle of the augmented control scheme. A flight control input device 40 input and a trim switch 42 input is transmitted as electrical signals 41 or 43 to the FCC 44. The FCC determines a position command 45 based on the input values and this position command is configured to define an elevator position 46 and stabilizer position 47. Environment and physics result in an airplane response 48, i.e., angle of attack, load factor, pitch rate, pitch attitude, and/or airspeed, and the sensor measurement of the airplane response is fed back to the FCC, which might alter the position command 45.

Figure 5:
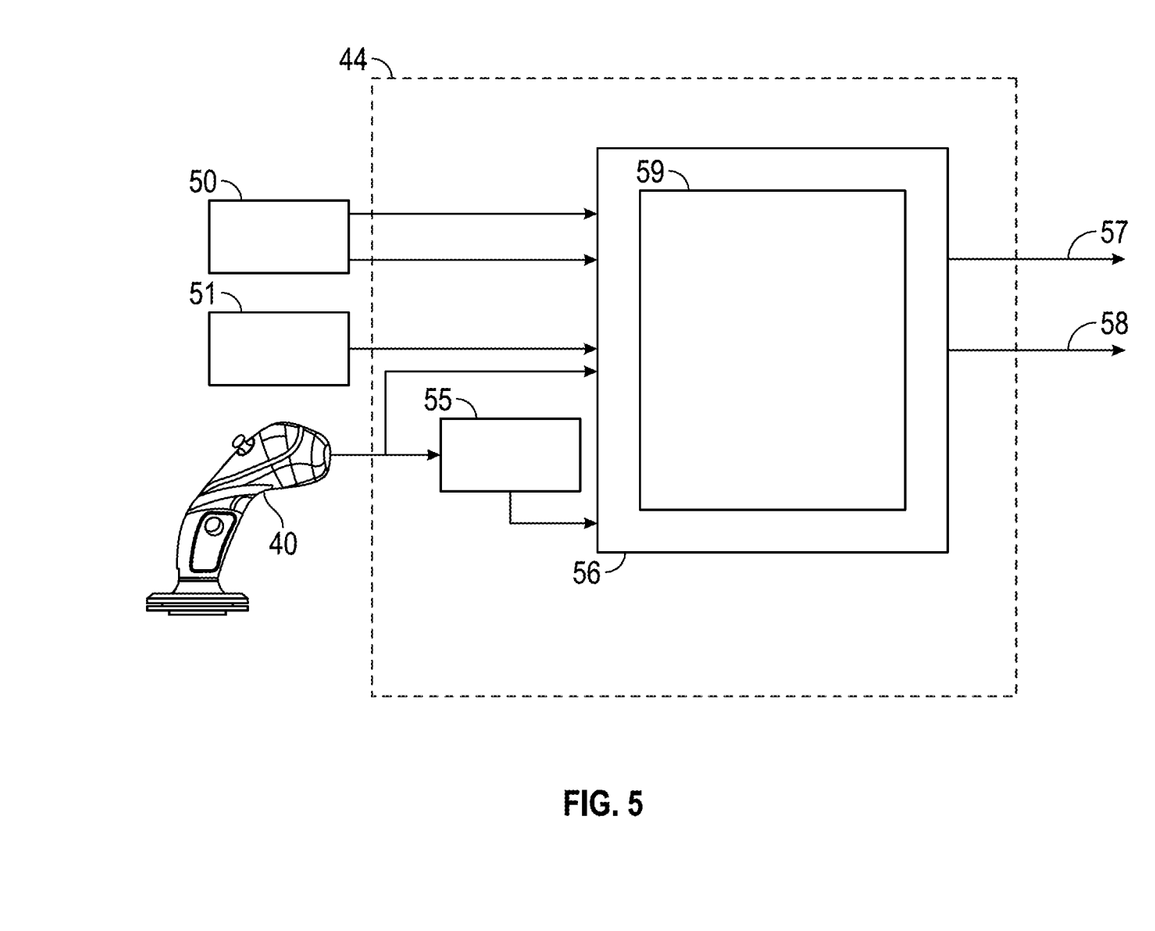
FIG. 5 is a schematic view illustrating a control unit in accordance with some non-limiting embodiments.

FIG. 5 schematically describes the elevator to stabilizer offload approach. Air data system 50, horizontal stabilizer actuator 51 and flight control input device 40 provide input values to the FCC 44. The flight control input device 40 provides the maneuver command which is provided to a pitch control module 55 and is taken as a basis for determining the elevator command. The FCC 44 comprises a control unit 56 which receives the input values and determines a stabilizer rate command 57 and an adjusted elevator command 58. In particular, the control unit 56 comprises a processor 59 which is configured to execute the required operations as described herein. It should be noted that a part or all of the operations described herein as being executed by the control unit 56 may be carried out by the processor 59. The processor 59 may comprise one or multiple processor cores or computation units which are configured to work at least partially in a redundant mode (at least two processor cores or computation units carry out the same operations) and/or in a cooperative mode (the processor cores or computation units each carry out a different and individually assigned operation as to contribute to the aimed result).

In normal operation, the pitch control law is the means whereby the flight control input device input in the pitch axis commands a maneuver. The maneuver command may be modified by the difference between trim reference speed and actual airspeed, U, to bring about speed stability. The maneuver command for a given flight control input device deflection may vary with flight condition. The flight control law may use feedback and feedforward signals to cause the airplane to achieve the commanded maneuver with the desired transient response.

Figure 6:
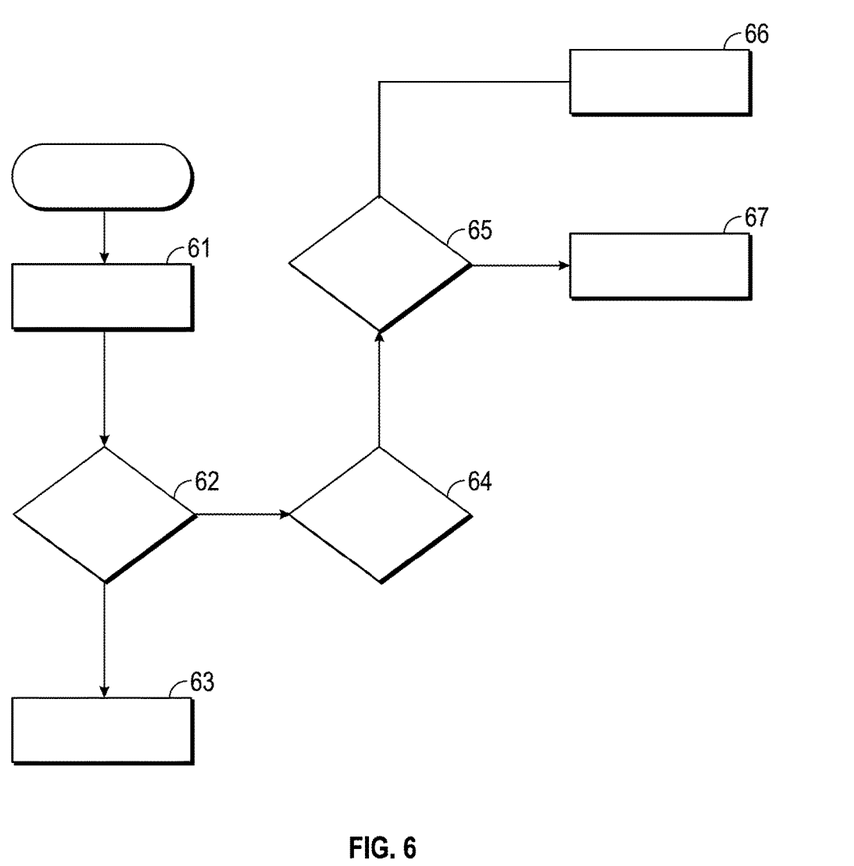
FIG. 6 is a schematic view illustrating the operation of a control unit in accordance with some non-limiting embodiments.

FIG. 6 schematically shows under which conditions and circumstances the control unit applies its working mode as described herein. In other words, the scheme shown in FIG. 6 defines constraints for the control unit. At the first stage 61, the inputs are received (left side of FIG. 5) and the control unit determines a stabilizer position and an elevator position. Subsequently, it is verified if the elevator position is outside of a desired region of elevator positions. This desired region of the elevator position is also referred to as "bowtie region" due to its shape, as will be described in further detail with reference to FIG. 7 below. If the elevator command results in a position which is not outside the desired region, the elevator offload function is not active, indicated by box 63. If, however, the elevator command results in a position which is outside the desired region, it is verified if the high incidence protection is active and a stabilizer nose-up command is indicated, see box 64. In case this is true, again the elevator offload function is not active. Otherwise, if the high incidence protection is not active, it is verified if high speed protection is active, see box 65. In case the high speed protection is not active, the control unit applies the elevator to stabilizer offload function, see box 67. Otherwise, if the high speed protection is active, only pitch down stabilizer commands are allowed by the FCC, box 66.

Figure 7:
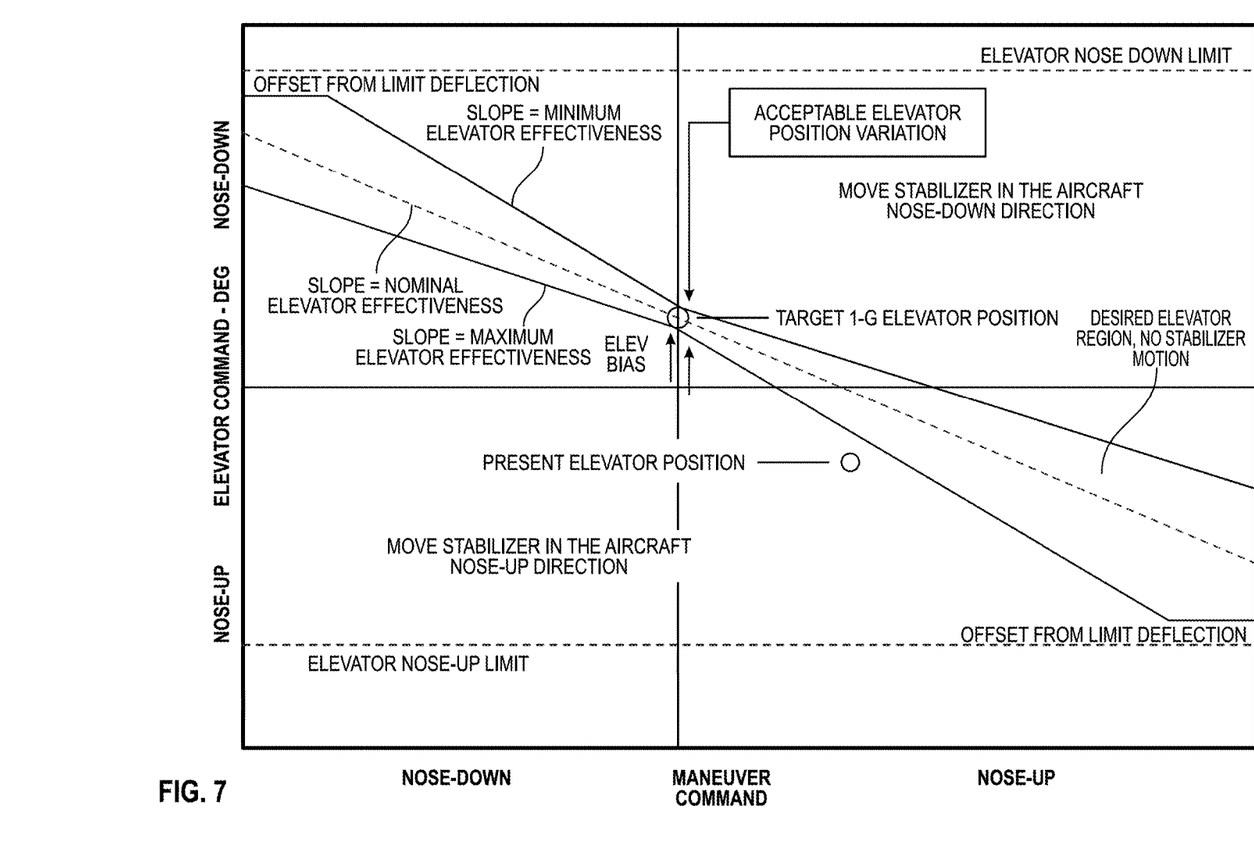
FIG. 7 is a schematic view illustrating the elevator to stabilizer offload approach in accordance with some non-limiting embodiments.

FIG. 7 describes the elevator to stabilizer offload approach according to an exemplary embodiment. FIG. 7 illustrates the logic used to move the horizontal stabilizer. This logic may apply only in-flight, and only when certain other priority modes are not active, as described with reference to FIG. 6, for example. For example, when airplane high speed protection mode or high incidence protection mode are active, several limitations (which are not described here) may be placed on stabilizer movement.

The desired region for the elevator command is indicated by the "bowtie" shaped region (hourglass shape extending from the top left corner to the bottom right corner of the diagram) The shape of this region ensures that the elevator is in position to provide the required maneuvers and avoids unnecessary activity on the stabilizer.

The diagram begins with the "target 1-g elevator position". The "target" position may vary with airplane flap setting and with airspeed. About this "target" position, acceptable elevator position variation sets the vertical distance between the target and the upper, lower "desired elevator region" limits. During a long duration cruise flight, as fuel is burned, the elevator command will gradually move though Nz Command is constant. The size of the acceptable variation is selected to keep stabilizer actuator duty cycle to an acceptable level—in other words to ensure the stabilizer does not adjust in cruise more often than is needed.

During maneuvering flight, the "desired elevator region" grows as maneuver command moves away from the target position 1-g. This is to allow for variation in elevator effectiveness due to weight and center of gravity. Maximum and minimum elevator effectiveness, at a given flight condition, but across all weight and center of gravity variations, are used to set the minimum and maximum slopes extending away from the 1.0 g datum. These diverging slopes form the "bowtie" region.

The bowtie region is truncated at the extremes of elevator deflection, see top left and bottom right corners of the diagram. This is to ensure that the stabilizer moves immediately in the correct direction in the event of elevator command saturation. For a large maneuver command that the elevator alone cannot produce in the airplane, the stabilizer will begin to run due to the 'flat spots' on the bowtie. This limit condition may rarely occur in flight, but may be possible especially in the rare case of failure conditions, especially with one elevator jammed and the opposite elevator enacting a large maneuver command.

Using the logic as described, the "present elevator command" (indicated in the diagram as such) is moved into the bowtie region by appropriate motion of the stabilizer. In other words, if the elevator command results in an elevator position outside the desired region ("bowtie region"), the stabilizer is moved accordingly as to bring back the elevator to the desired region. Within the elevator offload logic, a low-pass filter may be applied to the maneuver command and elevator command, so that the stabilizer is not responding to momentary variations.

Further, the elevator motion is an indirect result of stabilizer motion, rather than a direct consequence as the control algorithm computes elevator command continuously. It should further be noted that the entire diagram grows and shrinks roughly inversely to airspeed. The elevator nose up and down limits, the target 1-g elevator position, the slopes of the bowtie upper and lower limits are all continuously updated as a function of flight condition (airspeed, altitude) and configuration (flaps and landing gear).

In other words, one aspect of the description is the horizontal stabilizer control logic. Stabilizer control in conventional transport aircraft may be done via simple pilot input to the pitch trim switch. The pilot inputs trim commands to achieve zero pilot pitch input force. This may not be practical with an augmented control scheme, where the pitch trim switch controls the trim reference speed, rather than stabilizer position. Alternately the trim switch may not exist, or may only be used in certain failure conditions. In all these instances, some other means is needed to move the stabilizer to the desired position. The so-called elevator-to-stabilizer offload logic described herein is devised to accomplish this. The stabilizer control diagram and flow chart are shown in and described with reference to FIGS. 6 and 7.

Again with reference to FIGS. 6 and 7, the desired elevator position is calculated based on maneuver command from the flight control input device and the estimated elevator effectiveness. Elevator effectiveness is the relationship between elevator deflection and resulting airplane response at a given altitude/airspeed condition. A desired elevator bias, which is based upon airplane configuration, is applied. Tolerance around that desired position is used to define an acceptable elevator position range. The magnitude of the tolerance grows in proportion to the commanded deflection to reflect uncertainty in the true elevator per g. This results in a so-called bowtie plot, because the acceptable region takes the shape of a bowtie.

When the elevator command is outside the bowtie (see FIG. 7, position indicated with "present elevator position"), the stabilizer is commanded to move in the appropriate direction until the dot corresponding to the position of the elevator moves within the bowtie. In this exemplary embodiment, the maneuver command and elevator command used by this function are filtered to remove high frequency content. In the example shown, the elevator-to-stabilizer offload function would command the stabilizer in the aircraft-nose-up direction. This has the effect of keeping the airplane response to the commanded values while the flight control law responds by commanding a more positive elevator deflection, moving the elevator deflection toward the bowtie.

It should be noted that the slope of the nominal 'elevator effectiveness' line, and the width of the 'desired elevator region', along with the 'elevator bias' term may all be flight-condition dependent. Flight control input device relationship to maneuver command may also be flight-condition dependent. These dependencies make it possible to tailor the appropriate stabilizer control sensitivities throughout the airplane maneuver and flight envelope.

The approach presented above may be described in other words as follows. In aircraft utilizing an augmented control scheme, there may be two separate sources for elevator motion commands, namely the pilot control input device (this may be referred to as primary input) and the stabilizer to elevator offload (this may be referred to as secondary input or delta elevator command). The delta elevator command is applied to the elevator as to compensate for stabilizer motion so that the aerodynamic force remains constant even though the stabilizer is moved. This secondary input and the primary input of elevator motion commands are determined separate from each other. In particular, the primary input does not affect the secondary input. The secondary input is applied as to maintain the aerodynamic force at a constant value while the stabilizer is moved. Within the bowtie region shown in FIG. 7 there is no stabilizer motion. As a logical consequence, there is also no elevator motion resulting from the stabilizer to elevator offload, i.e., the secondary input or delta elevator command is zero. However, within the bowtie region there might be elevator motion resulting from the primary input, i.e., from the pilot control input device.

The purpose of the elevator to stabilizer offload is to replace long-term elevator deflection with equivalent stabilizer deflection. Therefore, if the elevator is brought back to a default position by replacing the elevator deflection with stabilizer deflection, greater ability of the airplane to maneuver up and down from the starting position is provided. In order to replace elevator deflection with stabilizer deflection, the stabilizer commands computed by the elevator to stabilizer offload function must be offset by an elevator command, so that the net aerodynamic force due to this trade-off remains constant. This is called the 'delta elevator command' which is independent of, and in addition to, the primary elevator command, and is a function only of the changing stabilizer command. Typically, the delta elevator command is proportional to the stabilizer command, where the proportion is a number K which typically is a negative number. The magnitude of K is derived from the elevator and stabilizer relative effectiveness. In the case where the elevator command falls outside the bowtie region, the stabilizer will be commanded to move in the appropriate direction. The delta elevator command will be K times the stabilizer command. In the case where the elevator command falls within the bowtie region, the stabilizer will be commanded to move at a rate of zero, thus restraining it to the current position. The delta elevator command will be K times zero, i.e., zero.

While the elevator can be moved within the bowtie region as a result of the primary input, the stabilizer command remains zero and the delta elevator command also remains zero. Thus, the elevator to stabilizer offload function reduces stabilizer movement by avoiding unnecessary stabilizer movement.

A command signal configured to retain a current position of the stabilizer is generated in case the elevator deflection is within the bowtie region. This generated command signal configured to retain a current position of the stabilizer can be actively generated, for example as a specific "hold"-signal, and can be interpreted as actively staying in the current position, i.e., the stabilizer is restrained from any kind of movement, independent of the source of such movement commands. Alternatively, retaining the current position of the stabilizer may also be achieved by just not sending any movement command signals. This may be a passive manner of retaining the current position, as just no move-command signals are provided to the stabilizer.

With reference to all embodiments mentioned in the foregoing description and the appended claims, the following additional definitions and remarks are provided.

An augmented control scheme as to be understood in the context of this description is a system that modifies the pilot control inputs in such a way as to alter the natural characteristics of an airplane for the purposes of improving handling characteristics, mitigating the effects of atmospheric disturbances, and keeping an aircraft within the defined operating envelope. Augmented control uses command augmentation, a filter applied to the pilot input itself, and feedback augmentation, using measured motion to correct to the desired motion. The augmented pilot command is sent to the aerodynamic pitch control surfaces, usually the elevators.

A pitch reference command is a general term used to represent the physical interpretation of the pilot stick input in an augmented control scheme. This could be load factor (Nz) command, pitch rate command, flight path rate command, angle of attack command, or combinations of the above in any given aircraft.

Typically, the elevator command corresponds to an angle of deflection of the elevator (or to a signal which reflects a specific angle of deflection) and may be determined or calculated based on the pitch reference command and in further consideration of parameters of the airplane like airspeed, load factor, pitch rate, dynamic pressure, and/or stabilizer position, for example.

The desired elevator value represents an angle of deflection of the elevator, too, and corresponds to a relationship between elevator deflection and commanded airplane response at a given altitude/airspeed condition; the desired elevator slope or function may be provided individually for different types of aircraft and/or for different flight configurations of one and the same aircraft.

The difference between determined elevator command and desired elevator position may be referred to as a calculated "error" in elevator deflection command in the current airplane configuration which is a result of the pitch reference command.

The desired maximum or minimum elevator deflection is, in general terms, the size of the desired region of elevator deflection, shaped like a bowtie, as a function of pitch reference command. Simply speaking, the bowtie-region can be defined by providing elevator command limits (aircraft nose up and nose down) relating to any pitch reference command; this may be done by using a lookup table, for example.

Generally, elevator deflection can be substituted by stabilizer deflection, or vice versa. It is one aspect of the description that the stabilizer is only moved under certain conditions in order to have the elevator position in a desired region. In other words, if the elevator deflection is excessive in either direction, i.e., is outside the bowtie-region, the stabilizer is moved in the corresponding direction as to reduce the elevator deflection. Otherwise, i.e., the elevator position is inside the bowtie region or at the border of the bowtie-region, the stabilizer is restrained from moving in order to have the number of stabilizer motion cycles reduced. Typically, the stabilizer is moved in a direction corresponding to a direction of movement of the elevator command as to reduce the absolute or relative deflection of the elevator.

When referring to the current position of the stabilizer, this indicates the stabilizer position at a given moment. The elevator deflection indicates the relative angle of the elevator with respect to the stabilizer, for example. The deflection is referred to one of either aircraft nose up or nose down. This means that the deflection results in a corresponding pitch motion of the aircraft.

Restraining stabilizer from movement may be implemented by a specific and explicit hold-command which results in actively hindering movement or by just not sending a move-command such that the stabilizer is held in its position.

The elevator aircraft-nose-up limit is a maximum allowable elevator deflection, which may vary with dynamic pressure. The predefined distance from aircraft-nose-up limit may be a small percentage apart from the aircraft-nose-up limit, for example within 10%, or, for instance, 5% of the overall elevator range. If the elevator gets close to the aircraft nose down limit, i.e., within the predefined distance, the stabilizer is run in the corresponding direction as to reduce the elevator deflection and to thus provide maneuver flexibility to the pilot. When the flight control scheme is asking for full available elevator in either direction, the stabilizer immediately runs in the correct direction.

Filtering the pitch reference command from high frequency content is to remove momentary elements from the command and to have the stabilizer respond only to the longer-duration elements. A frequency threshold value above which the command is filtered can be set to a specific predetermined value or it can be a variable value.

In one exemplary embodiment, the control unit may be configured to extract a desired elevator effectiveness value corresponding to the pitch reference command from a lookup-table. The lookup-table may contain an entry for several flight conditions, considering airspeed, Mach number, and altitude effects on elevator effectiveness. In one embodiment, the lookup table may contain the maximum elevator deflection as a function of pitch reference command value and flight condition (vertical height of the bowtie region at every one of the pitch reference command values, in both aircraft nose-up and nose-down directions).

In one embodiment, the control unit is configured to execute its operation in an iterative manner. This may result in a continuous motion of the stabilizer and the elevator, while the stabilizer is moved according to the principles set out in the description.

It should be noted that the details provided with respect to the control unit do also apply to an aircraft with such a control unit, where applicable.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control unit for controlling movement of a stabilizer and an elevator on an aircraft, the control unit comprising:
a processor, configured to:
receive a pitch reference command from a flight control input device of the aircraft;
determine, based on the pitch reference command, an elevator command configured to command the elevator in the aircraft nose-up or nose-down direction;
determine a difference between the elevator command and a desired elevator value based on an estimated elevator effectiveness and corresponding to the pitch reference command, wherein the estimated elevator effectiveness is a relationship between elevator deflection and resulting airplane response at a given altitude and airspeed condition;
determine a threshold value as a desired maximum value of the difference at a given pitch reference command;
compare the difference with the threshold value and in response thereto generate a command signal configured to retain a current position of the stabilizer when the difference is smaller than or equal to the threshold value, and to command the elevator in the aircraft nose-up or nose-down direction based on the pitch reference command.

2. The control unit of claim 1,
wherein the command signal is configured to restrain the stabilizer from moving in the aircraft nose-up or nose-down direction.

3. The control unit of claim 1,
wherein the command signal is configured to move the stabilizer in a direction of deflection that will offset or unload a deflection of the elevator when the difference is larger than the threshold value.

4. The control unit of claim 3,
wherein the control command is configured to move the stabilizer in aircraft-nose-up direction when the elevator command is excessively aircraft-nose-up relative to the desired elevator value.

5. The control unit of claim 3,
wherein the control command is configured to move the stabilizer in aircraft-nose-down direction when the elevator command is excessively aircraft-nose-down relative to the desired elevator value.

6. The control unit of claim 1,
wherein the processor is configured to determine a distance of the elevator from an aircraft-nose-up limit and to compare the distance with a predefined distance of the elevator from the aircraft-nose-up limit;
wherein the control command is configured to run the stabilizer in the aircraft-nose-up direction when the distance of the elevator from the aircraft-nose-up limit is smaller than the predefined distance of the elevator from the aircraft-nose-up limit.

7. The control unit of claim 1,
wherein the processor is configured to determine a distance of the elevator from an aircraft-nose-down limit and to compare the distance with a predefined distance of the elevator from the aircraft-nose-down limit;
wherein the control command is configured to run the stabilizer in the aircraft-nose-down direction when the distance of the elevator from the aircraft-nose-down limit is smaller than the predefined distance of the elevator from the aircraft-nose-down limit.

8. The control unit of claim 1,
wherein the processor is configured to determine an airspeed of the aircraft;

wherein the processor is further configured to compare the determined airspeed with a predetermined speed limit and to restrain the stabilizer from moving in an aircraft nose-down direction when the predetermined speed limit is reached.

9. The control unit of claim 1, wherein the processor is configured to filter the pitch reference command from high frequency content.

10. The control unit of claim 1, wherein the processor is configured to filter the elevator command from high frequency content.

11. The control unit of claim 1, wherein the processor is configured to extract an estimated elevator effectiveness value corresponding to the pitch reference command from a lookup-table.

12. The control unit of claim 1, wherein the processor is configured to extract the threshold value for the desired maximum elevator deflection at a given pitch reference command from a lookup-table.

13. The control unit of claim 1, wherein the processor is configured to execute its operation in an iterative manner.

14. An aircraft, comprising:
a horizontal stabilizer and an elevator for pitch axis control;
a flight control input device;
a control unit with a processor, wherein the processor is configured to receive a pitch reference command from the flight control input device and for determining, based at least on the pitch reference command, an elevator command configured to command the elevator to move in a nose-up or a nose-down direction;
wherein the processor is configured to determine a difference between the determined elevator command and a desired elevator value based on an estimated elevator effectiveness and corresponding to the received pitch reference command and to further determine a threshold value as a desired maximum value of the difference at a given pitch reference command wherein the estimated elevator effectiveness is a relationship between elevator deflection and resulting airplane response at a given altitude and airspeed condition;

wherein the processor is further configured to compare the difference with the threshold value and in response thereto generate a command signal configured to move the elevator based on the pitch reference command and to retain a current position of the stabilizer when the difference is smaller than or equal to the threshold value.

15. The aircraft of claim 14, wherein the processor is configured to generate a stabilizer command configured to move the stabilizer in a direction of deflection that will offset or unload the deflection of the elevator when the difference is larger than the threshold value.

16. The aircraft of claim 14, wherein the command signal is configured to restrain the stabilizer from moving in the aircraft nose-up or nose-down direction.

17. The aircraft of claim 14, wherein the command signal is configured to move the stabilizer in a direction of deflection that will offset or unload a deflection of the elevator when the difference is larger than the threshold value.

18. The aircraft of claim 17, wherein the control command is configured to move the stabilizer in aircraft-nose-up direction when the elevator command is excessively aircraft-nose-up relative to the desired elevator value.

19. The aircraft of claim 17, wherein the control command is configured to move the stabilizer in aircraft-nose-down direction when the elevator command is excessively aircraft-nose-down relative to the desired elevator value.

20. The aircraft of claim 14, wherein the processor is configured to determine a distance of the elevator from an aircraft-nose-up limit and to compare the distance with a predefined distance of the elevator from the aircraft-nose-up limit;
wherein the control command is configured to run the stabilizer in the aircraft-nose-up direction when the distance of the elevator from the aircraft-nose-up limit is smaller than the predefined distance of the elevator from the aircraft-nose-up limit.

* * * * *